(12) United States Patent  
Merlin (10) Patent No.: US 8,761,234 B2
(45) Date of Patent: Jun. 24, 2014

(54) RATE SELECTION FOR FRAMES IN WIRELESS DEVICES

(71) Applicant: QUALCOMM Incorporated, San Diego, CA (US)

(72) Inventor: Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 13/659,171

(22) Filed: Oct. 24, 2012

(65) Prior Publication Data

US 2013/0100994 A1   Apr. 25, 2013

Related U.S. Application Data

(60) Provisional application No. 61/551,293, filed on Oct. 25, 2011.

(51) Int. Cl.
*H04B 1/38* (2006.01)
*H04L 5/16* (2006.01)

(52) U.S. Cl.
USPC ........................................................ 375/219

(58) Field of Classification Search
CPC .................................................... H04L 1/0003
USPC ........................................................ 375/219
See application file for complete search history.

(56) References Cited

U.S. PATENT DOCUMENTS

| | | | |
|---|---|---|---|
| 8,098,640 B2 | 1/2012 | Trainin | |
| 2005/0152473 A1 | 7/2005 | Maltsev et al. | |
| 2007/0097981 A1 | 5/2007 | Papasakellariou | |
| 2008/0316981 A1* | 12/2008 | Trainin | ................ 370/338 |
| 2011/0110349 A1 | 5/2011 | Grandhi | |
| 2012/0063439 A1 | 3/2012 | Seok | |

FOREIGN PATENT DOCUMENTS

| | | |
|---|---|---|
| EP | 2086153 A2 | 8/2009 |
| WO | WO2012057960 | 5/2012 |

OTHER PUBLICATIONS

Stephens, "802.11 TGac WG Letter Ballot LB187 Proposed resolutions to comments on Clauses 1-3," doc.: IEEE 802.11-12/0226r6, IEEE P802.11 Wireless LANs, pp. 1-25, Mar. 2012.
International Search Report and Written Opinion—PCT/US2012/061970—ISA/EPO—Jan. 15, 2013.
QUALCOMM: "VHT Supported MCS Field", Internet Citation, Jan. 17, 2011, pp. 1-9, XP002671953, Retrieved from the Internet: URL:https://mentor.ieee.org/802.11/documen ts?n=10&is group=00ac&is year=2011V [retrieved on Mar. 20, 2012].
Zhou K, et al., "Cross-layer Optimization for A-MPDU with HT-immediate Block Acknowledgement in Non-competitive Channel Environment", Consumer Communications and Networking Conference (CCNC), 2011 IEEE, IEEE, Jan. 9, 2011, pp. 971-972, XP031866103, DOI: 10.1109/CCNC.2011.5766655 ISBN: 978-1-4244-8789-9 .

* cited by examiner

*Primary Examiner* — Erin File
(74) *Attorney, Agent, or Firm* — Dang M. Vo (57) ABSTRACT

Certain aspects of the present disclosure provide techniques for selecting a modulation class, coding rate, and/or modulation and coding (MCS) scheme for transmission of a response message corresponding to a received message. Different rules may be applied for selecting the MCS scheme depending on whether or not the frame eliciting the response was transmitted as high throughput (HT) or very high throughput (VHT) transmission.

23 Claims, 7 Drawing Sheets

RATE SELECTION FOR FRAMES IN WIRELESS DEVICES

CLAIM OF PRIORITY UNDER 35 U.S.C. §119

The present Application for Patent claims priority to U.S. Provisional Application No. 61/551,293, entitled, "Rate Selection for Frames in Wireless Devices," filed Oct. 25, 2011, and assigned to the assignee hereof, which is hereby expressly incorporated by reference herein.

TECHNICAL FIELD

Certain aspects of the present disclosure generally relate to wireless communications and, more particularly, to selecting modulation and coding (MCS) and rate for frames in very high throughput devices.

BACKGROUND

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

Current IEEE 802.11ac specifications do not describe how a station should select a transmission rate and/or modulation and coding scheme (MCS) for control response frames. Accordingly, techniques are needed for selecting a MCS and rate in response to reception of a frame (e.g., a control frame or other type of frame) that elicits a response. The selected MCS may be used by a wireless device to transmit a response to the received frame.

SUMMARY

Certain aspects of the present disclosure provide an apparatus for wireless communications. The apparatus generally includes a receiver configured to receive a frame that elicits a response, a circuitry configured to select a modulation class and a modulation and coding scheme (MCS) for transmission of the response, wherein the circuitry is configured to apply different rules for selecting the modulation class and MCS depending on whether the frame was transmitted with a high throughput (HT), very high throughput (VHT), or non-HT modulation class, and a transmitter configured to transmit the response using the selected modulation class and the selected MCS.

Certain aspects of the present disclosure provide a method for wireless communications. The method generally includes receiving a frame that elicits a response, selecting a modulation class and a modulation and coding scheme (MCS) for transmission of the response by applying different rules for selecting the modulation class and MCS depending on whether the frame was transmitted with a high throughput (HT), very high throughput (VHT), or non-HT modulation class, and transmitting the response using the selected modulation class and the selected MCS.

Certain aspects of the present disclosure provide an apparatus for wireless communications. The apparatus generally includes means for receiving a frame that elicits a response, means for selecting a modulation class and a modulation and coding scheme (MCS) for transmission of the response, wherein the means for selecting comprises means for applying different rules for selecting the modulation class and MCS depending on whether the frame was transmitted with a high throughput (HT), very high throughput (VHT), or non-HT modulation class, and means for transmitting the response using the selected modulation class and the selected MCS.

Certain aspects of the present disclosure provide a computer-program product for wireless communications. The computer-program product typically includes a non-transitory computer-readable medium having instructions executable for receiving a frame that elicits a response, selecting a modulation class and a modulation and coding scheme (MCS) for transmission of the response by applying different rules for selecting the modulation class and MCS depending on whether the frame was transmitted with a high throughput (HT), very high throughput (VHT), or non-HT modulation class, and transmitting the response using the selected modulation class and the selected MCS.

Certain aspects provide a station for wireless communications. The station generally includes at least one antenna, a receiver configured to receive, via the at least one antenna, a frame that elicits a response, a circuitry configured to select a modulation class and a modulation and coding scheme (MCS) for transmission of the response, wherein the circuitry is configured to apply different rules for selecting the modulation class and MCS depending on whether the frame was transmitted with a high throughput (HT), very high throughput (VHT), or non-HT modulation class, and a transmitter configured to transmit the response using the selected modulation class and the selected MCS.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Figure 1:
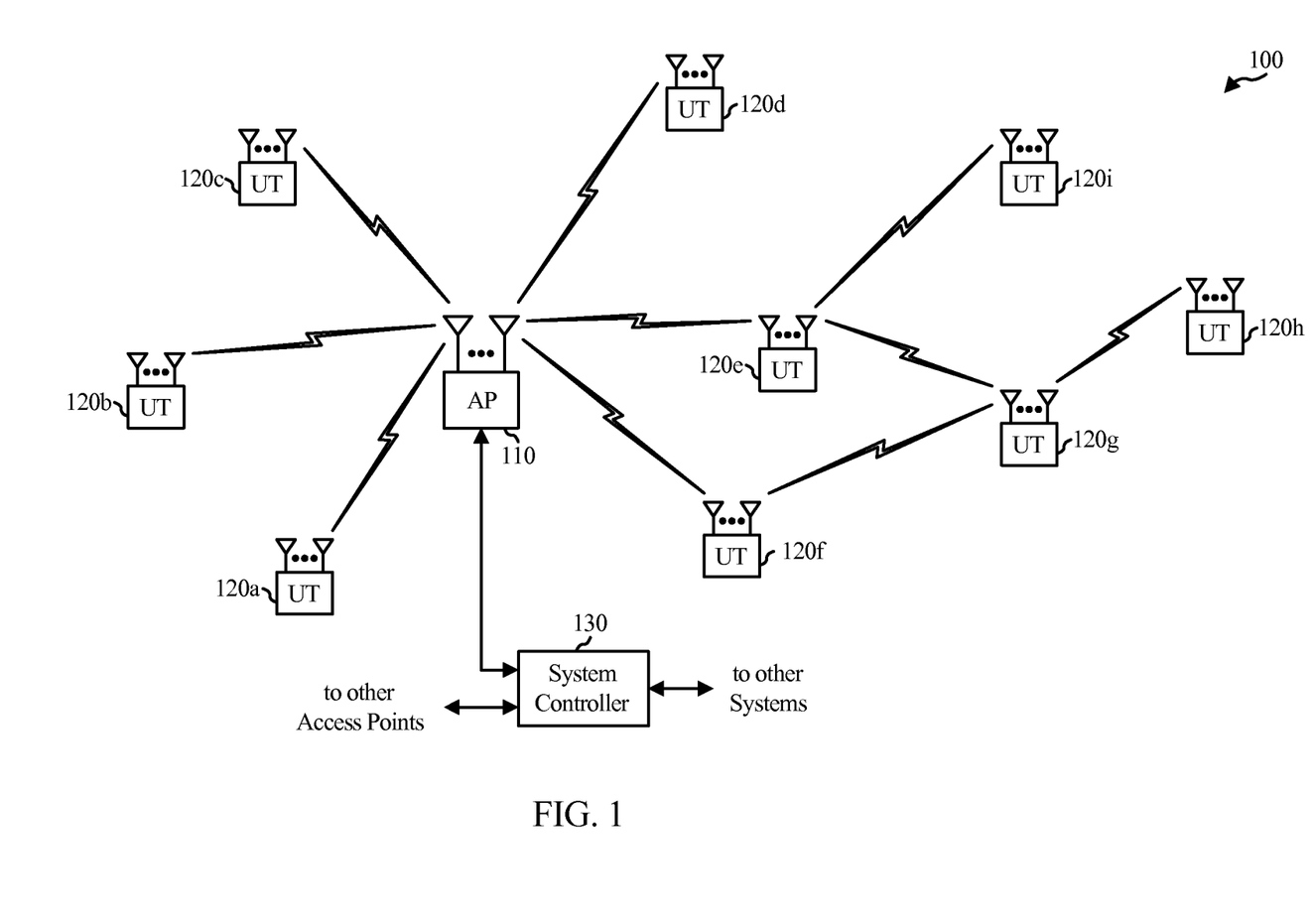
FIG. 1 illustrates a diagram of a wireless communications network in accordance with certain aspects of the present disclosure.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
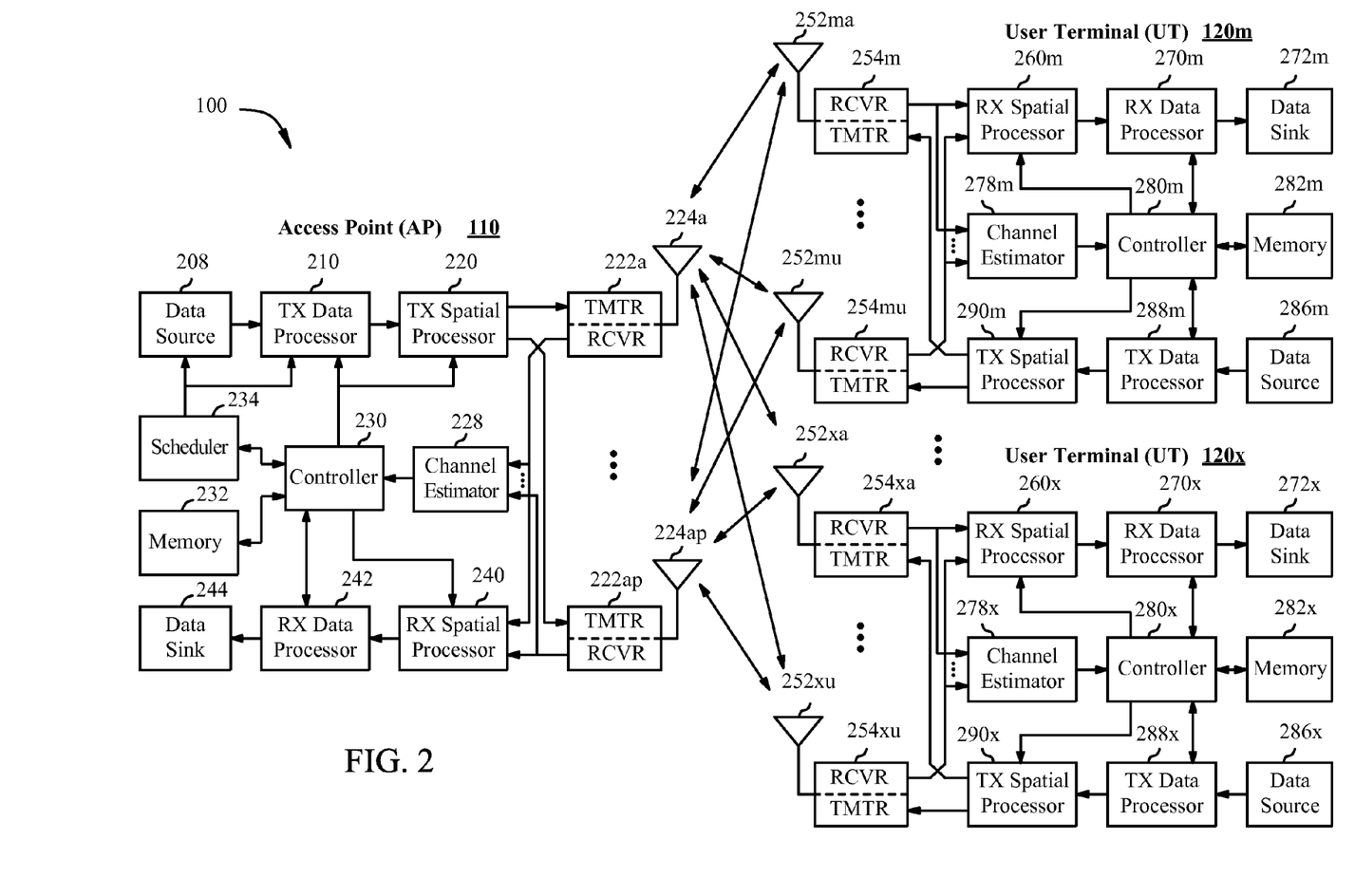
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively. Controllers 230 and 280 may be coupled to the memories 232 and 282, respectively.

Figure 3:
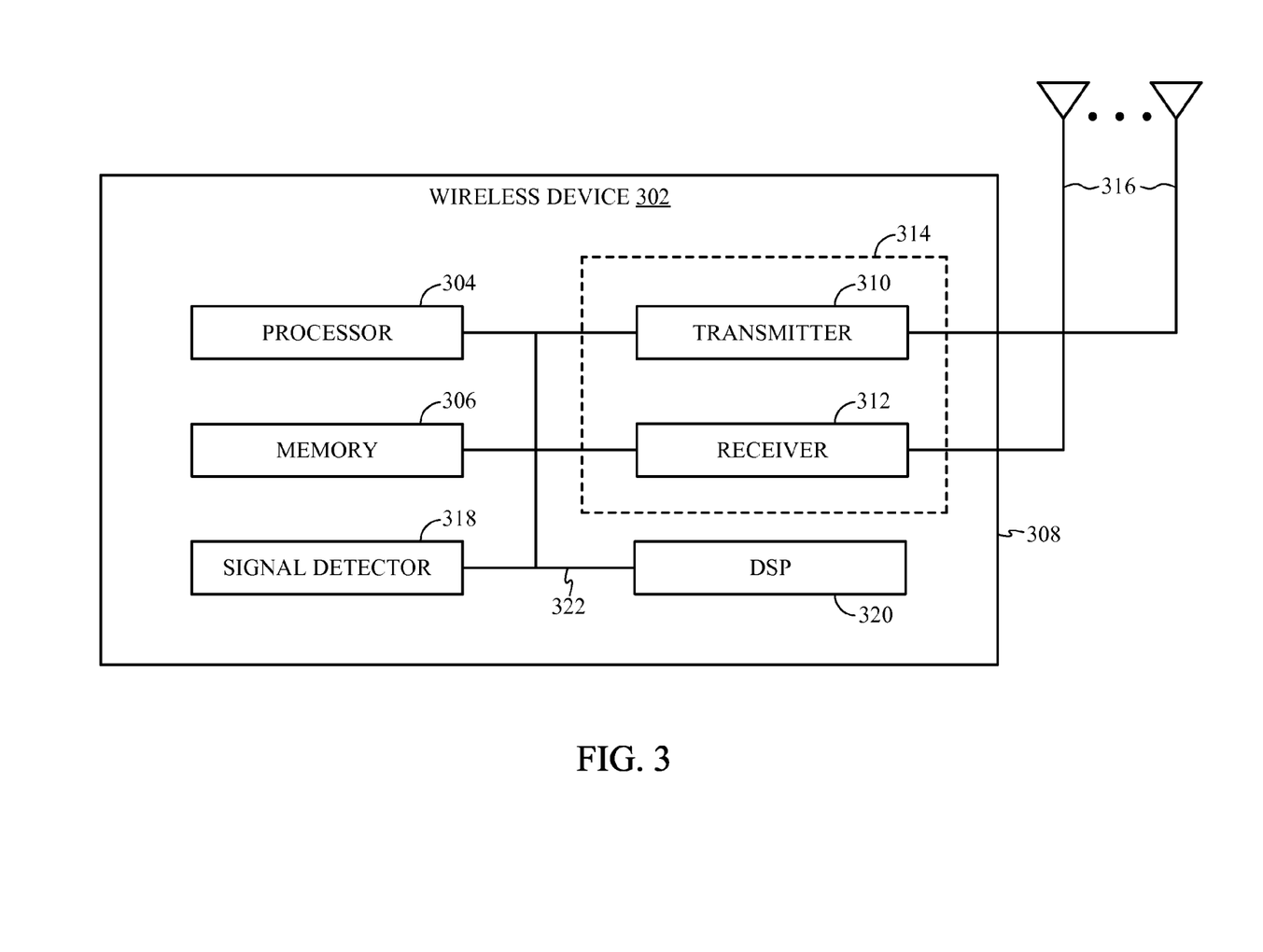
FIG. 3 illustrates a block diagram of an example wireless device in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

An Example Frame Structure

IEEE 802.11ac is an amendment to the IEEE 802.11 standard that enables higher throughput in IEEE 802.11 networks. The higher throughput is realized through several measures, such as the use of MU-MIMO (multiuser multiple input multiple output) and 80 MHz or 160 MHz channel bandwidth. IEEE 802.11ac is also referred to as Very High Throughput (VHT).

Figure 4:
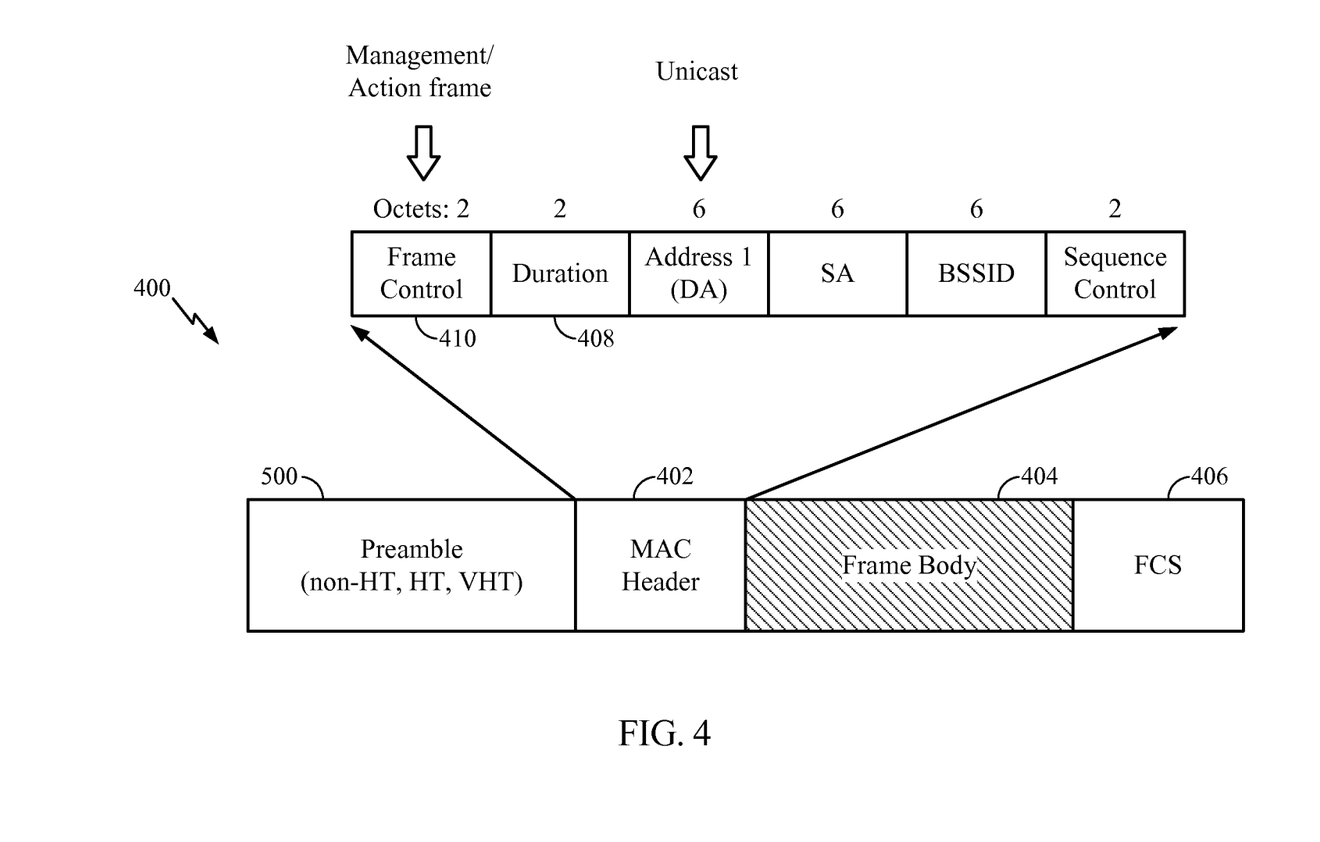
FIG. 4 illustrates an example frame structure for wireless communications in accordance with certain aspects of the present disclosure.

In order to communicate, the access point (AP) 110 and the user terminals 120 in a wireless network (e.g., system 100 illustrated in FIG. 1) may exchange messages according to certain frame structures. FIG. 4 illustrates an example frame structure 400 for wireless communications in accordance with certain aspects of the present disclosure. A short frame, such as a Request to Send (RTS) or a Clear to Send (CTS) frame may comprise this frame structure. The frame structure 400 may comprise a preamble 500, a Media Access Control (MAC) header 402, a frame body 404, and a frame check sequence (FCS) 406. The MAC header 402 may include a Frame Control field 410, a Duration field 408, a Destination Address (DA) field, a Source Address (SA) field, a Basic Service Set Identifier (BSSID) field, and a Sequence Control field.

Figure 5:
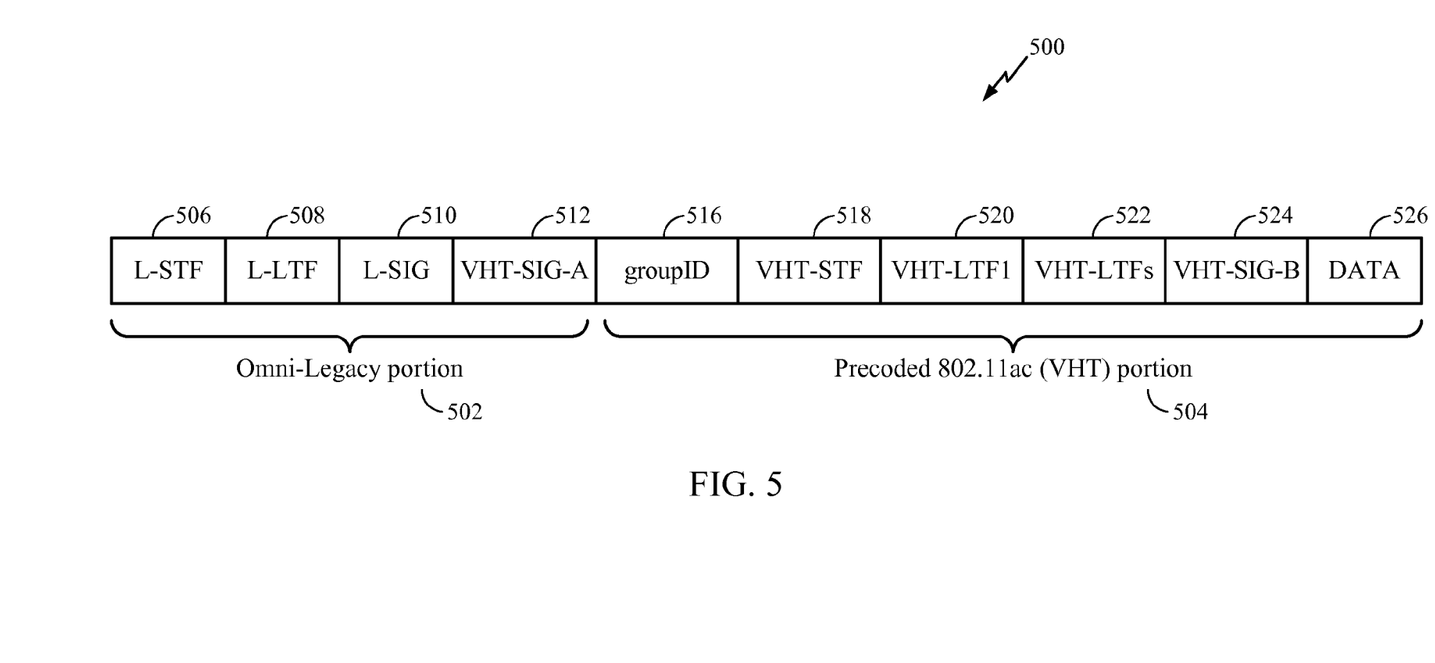
FIG. 5 illustrates an example preamble structure in accordance with certain aspects of the present disclosure.

FIG. 5 illustrates an example structure of a preamble 500 in accordance with certain aspects of the present disclosure. The preamble 500 may comprise an omni-legacy portion 502 (e.g., the non-beamformed portion) and a precoded IEEE 802.11ac VHT (Very High Throughput) portion 504. The legacy portion 502 may include a Legacy Short Training Field (L-STF) 506, a Legacy Long Training Field 508, a Legacy Signal (L-SIG) field 510, and two OFDM symbols in two VHT Signal A (VHT-SIG-A) fields 512, 514. For certain aspects, the legacy portion 502 may also include a group identifier (ID) field 516 to convey to all supported STAs that a particular set of STAs will be receiving spatial streams of a MU-MIMO transmission.

The precoded 802.11ac VHT portion 504 may include a VHT Short Training Field (VHT-STF) 518, a VHT Long Training Field 1 (VHT-LTF1) 520, VHT Long Training Fields (VHT-LTFs) 522, a VHT Signal B (VHT-SIG-B) field 524, and a data portion 526. The VHT-SIG-B field 524 may include one OFDM symbol and may be transmitted precoded/beamformed.

Example Rate Selection for Response Frames

Certain aspects of the present disclosure present techniques for selecting a coding rate, modulation class, and/or modulation and coding scheme for a response message based on the characteristics of the received message. The proposed method may be used by different types of stations such as legacy stations, stations that operate under IEEE 802.11n standard (e.g., high throughput (HT) stations), and stations that operate under IEEE 802.11ac standard (e.g., VHT stations).

Current IEEE 802.11ac specifications do not describe how a station (STA) should select a transmission rate and/or modulation and coding scheme (MCS) for control response frames. Accordingly, techniques are needed for selecting a MCS and rate in response to reception of a frame (e.g., a control frame or other type of frame) that elicits a response. The selected MCS may be used by a wireless device to transmit a response to the received frame.

A control response frame is a control frame that is transmitted as a response to the reception of a frame a short inter-frame space (SIFS) time after reception of a physical layer convergence protocol (PLCP) protocol data unit (PPDU) containing the frame that elicited the response, e.g. a clear to send (CTS) in response to a request to send (RTS) reception, an acknowledgment (ACK) in response to a data reception, or a BlockAck in response to reception of a BlockAck Request. In some situations, the transmission of a control frame is not a control response transmission, such as when a CTS is used to initiate a transmit opportunity (TXOP).

In general, the wireless network 100 may include different kinds of stations such as legacy stations, HT stations, and VHT stations. Each of these stations may be able to support different modulation and coding schemes. Set of modulation and coding schemes and their corresponding parameters supported by each type of stations may be defined in the network. For certain aspects, the MCS may also identify number of spatial streams that are supported by each station. For example, a first MCS set (e.g., BSSBasicMCSSet) may be a set of MCSs supported by HT stations, and a second MCS set (e.g., VHTBSSBasicMCSSet) may be a set of MCSs supported by VHT stations. As an example, the BSSBasicMCSSet may include 64 QAM (Quadrature Amplitude Modulation) with coding rates $\frac{2}{3}$, $\frac{3}{4}$ and $\frac{5}{6}$. The VHTBSSBasicMCSSet may include 256 QAM with coding rates $\frac{3}{4}$ and $\frac{5}{6}$. List of all of the MCSs that are supported by different stations in the network may be stored in a third set (e.g., CandidateMCSSet). As an example, the CandidateMCSSet may be a combination of the parameters in the BSSBasicMCSSet and the VHTBSSBasicMCSSet. If the BSSBasicMCSSet and the VHTBSSBasicMCSSet are empty, the CandidateMCSSet may consist of the set of mandatory physical layer (PHY) MCSs corresponding to a station eliciting a response. For example, if the station eliciting a response is an HT station, the CandidateMCSSet may consist of set of mandatory HT PHY MCSs. If the station (STA) eliciting the response is a VHT STA, the CandidateMCSSet may consist of set of mandatory HT PHY MCSs and VHT PHY MCSs, and the like.

Certain aspects of the present disclosure provide techniques for selecting a MCS for transmission of a response message after receiving a frame. Different rules may be applied for selecting the MCS depending on whether or not the frame eliciting the response was sent as a multi-user transmission and/or as a VHT frame.

Figure 6:
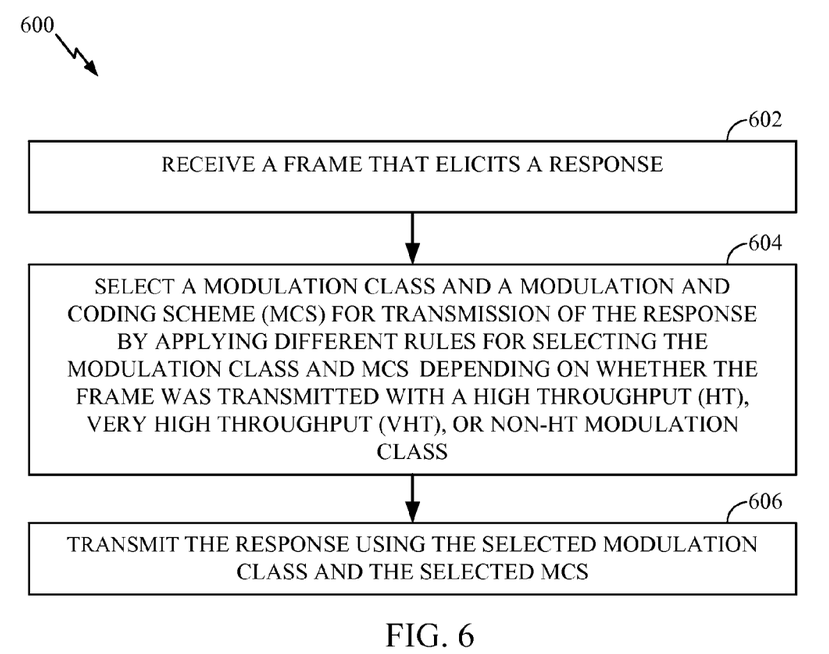
FIG. 6 illustrates example operations that may be performed by a wireless device to select MCS for a response to a frame, in accordance with certain aspects of the present disclosure.

FIG. 6 illustrates example operations that may be performed by a wireless device to select MCS for a response frame, in accordance with certain aspects of the present disclosure. At 602, the wireless device may receive a frame that elicits a response, such as a control frame or any other type of frame eliciting a response.

At 604, the wireless device may select a modulation class, and modulation and coding scheme (MCS) for transmission of the response by applying different rules for selecting the modulation class and the MCS depending on whether the frame was transmitted with a high throughput (HT), very high throughput (VHT), or non-HT modulation class. At 606, the wireless device may transmit the response using the selected modulation class and selected MCS.

For certain aspects, the wireless device may select a MCS for transmission of the response from a set of supported MCSs (e.g., CandidateMCSSet). Different rules may be applied for selecting the MCS depending on whether or not the data unit (DU) eliciting the response was sent as a multi-user transmission. For example, the wireless device may use different rules if the frame eliciting the response is within a non-HT physical layer convergence protocol (PLCP) protocol data unit (PPDU), a HT-PPDU or a VHT-PPDU. A non-HT PPDU may be used by any station including legacy stations, a HT-PPDU may be used by HT and/or VHT stations, and a VHT-PPDU may only be used by VHT stations.

For certain aspects, a response may be transmitted using a VHT modulation class only if the frame was transmitted using a VHT modulation class. For certain aspects, the VHT modulation class used for the response message may be similar to or different from the VHT modulation class used for transmission of the frame. For another aspect, the response may be transmitted using a VHT, HT, or non-HT modulation class if the frame was transmitted using a VHT modulation class.

For certain aspects, the wireless device may determine number of spatial streams and modulation order of the received control frame if the DU eliciting the response was sent as a multi-user and/or VHT transmission. The wireless device may then select the MCS that corresponds to number of spatial streams that is equal to or smaller than the number of spatial streams of the received control frame. The selected MCS may also correspond to a modulation order that is equal to or smaller than the modulation order of the received control frame.

For certain aspects, the wireless device may identify a set of supported MCSs and update the set of supported MCSs by eliminating one or more MCSs from the set that correspond to number of spatial streams that are higher than the number of spatial streams of the received control frame. The wireless device may also eliminate one or more MCSs from the set that correspond to higher modulation orders than the modulation order of the received control frame. The wireless device may then select a primary MCS from the updated set of supported MCSs that corresponds to the highest number of spatial streams and highest modulation order of the remaining MCSs in the updated set of supported MCSs. For certain aspects, the wireless device may transmit the response using the primary MCS. For certain aspects, the wireless device may select the MCS corresponding to a lower data rate than the data rate of the received control frame. For certain aspects, the set of supported MCSs may include one or more MCSs that are supported by all non-HT, HT, or VHT stations in the BSS.

As described earlier, the set of supported MCSs may include one or more MCSs corresponding to high throughput transmissions, and/or one or more MCSs corresponding to very high throughput transmissions. As an example, if the frame eliciting the response is within a non-HT PPDU, a wireless device may eliminate, from the CandidateMCSSet, all the VHT MCSs and the MCSs that have a data rate greater than the data rate of the received PPDU. The wireless device may then find the highest indexed MCS from the CandidateMCSSet. The index of this MCS may be set as the index of the MCS that is the primary MCS for the response transmission. In some aspects, if the CandidateMCSSet is empty, the primary MCS may be chosen as the lowest indexed MCS of the mandatory MCSs.

Alternatively, if the frame eliciting the response is within an HT PPDU, the wireless device may eliminate, from the CandidateMCSSet, all the VHT MCSs and all the MCSs that have an index that is higher than the index of the MCS of the received frame. The wireless device may then eliminate all the MCSs that have higher number of spatial streams and higher modulation order than the received frame. In some aspects, if the CandidateMCSSet set is empty, mandatory HT MCSs may be included in the CandidateMCSSet and the above procedure may be repeated.

For certain aspects, if the frame eliciting the response is within a VHT PPDU, the wireless device may eliminate, from the CandidateMCSSet, all the MCSs that have a data rate that is higher than the data rate of the MSC of the received frame.

The wireless device may then eliminate all the MCSs that have higher number of spatial streams or higher modulation order than the received frame. In some aspects, if the CandidateMCSSet set is empty, mandatory VHT MCSs may be included in the CandidateMCSSet and the above procedure may be repeated.

Figure 7:
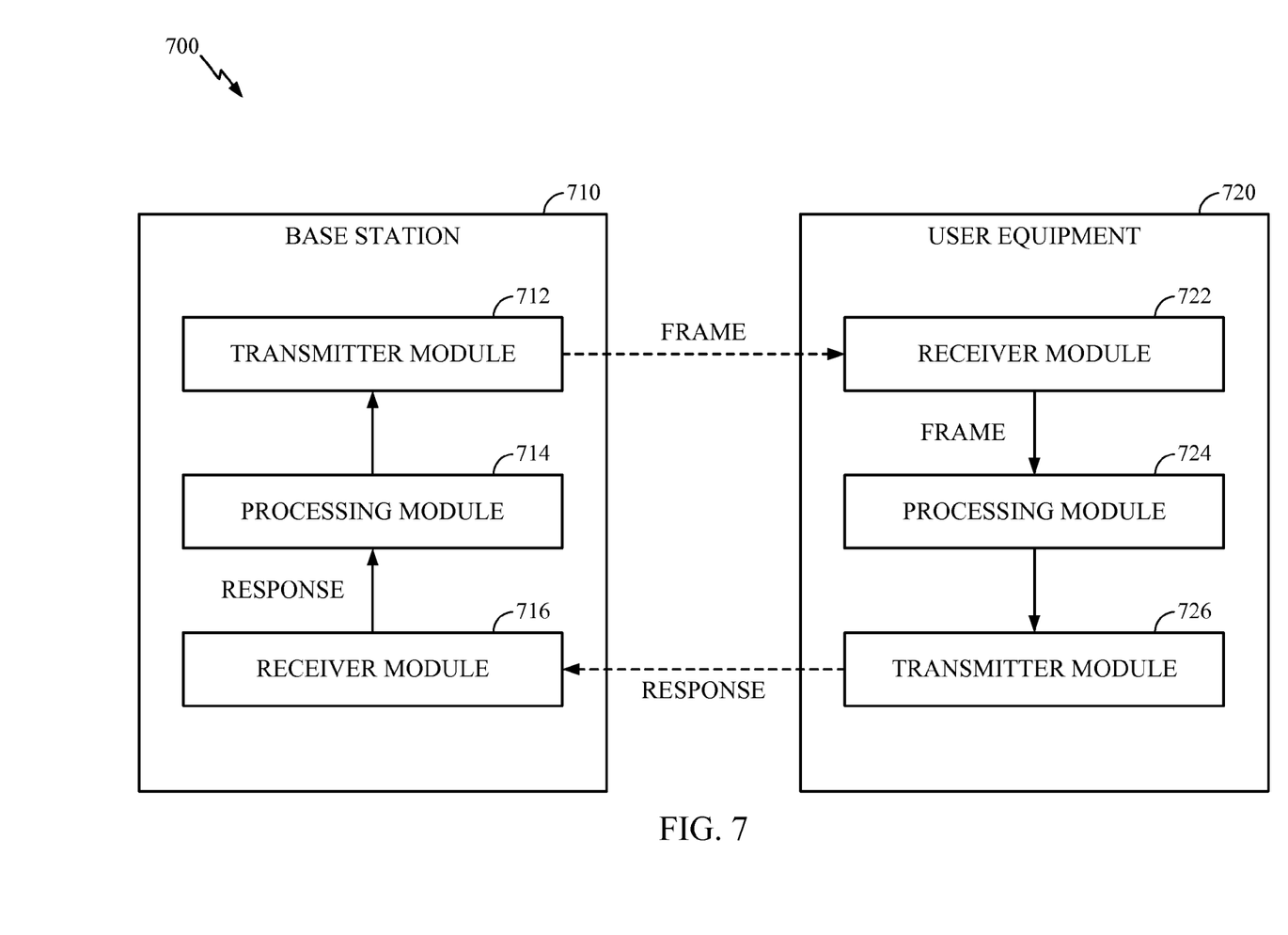
FIG. 7 illustrates an example communication system utilizing the proposed parameter selection method, in accordance with certain aspects of the present disclosure.

FIG. 7 illustrates an example communication system 700 utilizing the proposed coding rate and MCS selection method, in accordance with certain aspects of the present disclosure. The communication system 700 includes a base station (e.g., eNodeB) 710 and one or more UEs 720 (only one is shown in the figure). The base station may include a transmitter module 712 for transmitting a message (e.g., a control message) that elicits a response to the UE. The UE 720 may receive the message with the receiver module 722. As described herein, the processing module 724 may select a modulation class, coding rate and/or MCS for the response message based at least on the characteristics of the received message. The transmitter module 726 may transmit the response message to the base station 710 using the selected MCS. The base station receives the response message through receiver module 716, analyzes the response message in the processing module 714, and continues communication with the UE based on the information received in the response message.

Figure 6A:
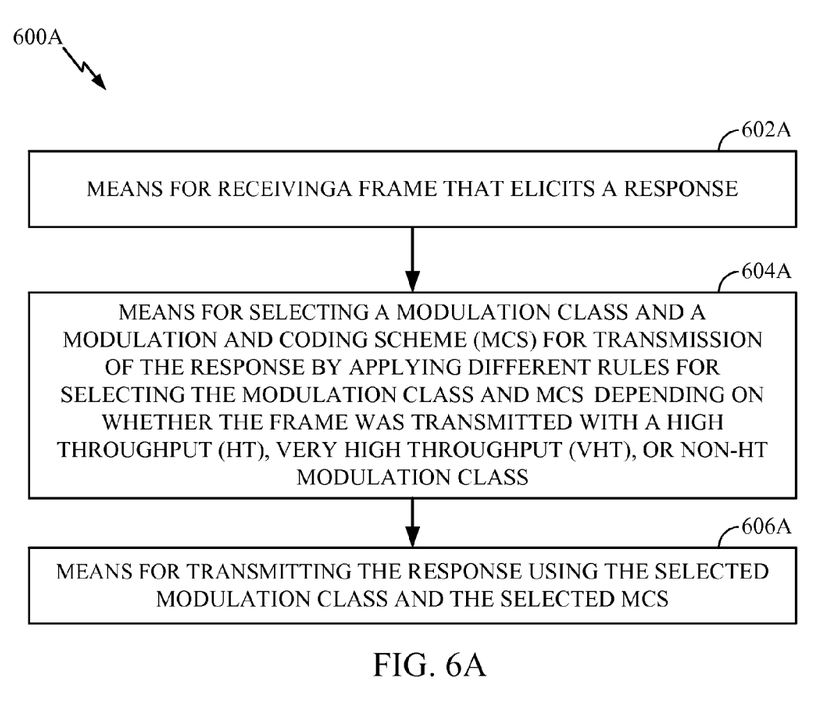
FIG. 6A illustrates example means for performing the operations shown in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 illustrated in FIG. 6 correspond to means 600A illustrated in FIG. 6A.

For example, means for transmitting the response may comprise a transmitter, such as the transmitter unit 222 of the access point 110 illustrated in FIG. 2, the transmitter unit 254 of the user terminal 120 depicted in FIG. 2, or the transmitter 310 of the wireless device 302 shown in FIG. 3. Means for receiving may comprise a receiver, such as the receiver unit 222 of the access point 110 illustrated in FIG. 2, the receiver unit 254 of the user terminal 120 depicted in FIG. 2, or the receiver 312 of the wireless device 302 shown in FIG. 3. Means for selecting a MCS, and/or means for determining number of spatial streams, and/or means for identifying a set of supported MCSs, and/or means for updating the set of supported MCSs may comprise a processing system, which may include one or more processors, such as the RX data processor 270 and/or the controller 280 of the user terminal 120 or the RX data processor 242 and/or the controller 230 of the access point 110 illustrated in FIG. 2.

In addition, circuitry configured to perform a function (e.g., select, identify, determine, etc.) may be any combination of processing elements or logic circuits, such as general purpose and/or special purpose processors, and the like.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM, or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. An apparatus for wireless communications, comprising:
a receiver configured to receive a frame that elicits a response;
a circuitry configured to select a modulation class and a modulation and coding scheme (MCS) for transmission of the response, wherein the circuitry is configured to apply different rules for selecting the modulation class and MCS depending on whether the frame was transmitted with a high throughput (HT), very high throughput (VHT), or non-HT modulation class; and a transmitter configured to transmit the response using the selected modulation class and the selected MCS.

2. The apparatus of claim 1, wherein the rules allow the response to be transmitted using a VHT modulation class only if the frame was transmitted using a VHT modulation class.

3. The apparatus of claim 1, wherein the rules allow the response to be transmitted using a HT or non-HT modulation class if the frame was transmitted using a VHT modulation class.

4. The apparatus of claim 1, wherein the circuitry is configured to:
determine number of spatial streams and modulation order of the received frame if the frame was transmitted as a VHT transmission, wherein the selected MCS corresponds to a number of spatial streams that is equal or smaller than the determined number of spatial streams of the received frame, and the selected modulation order is equal to or smaller than the determined modulation order of the received frame.

5. The apparatus of claim 4, wherein the circuitry is further configured to:
identify a set of supported MCSs; and
update the set of supported MCSs by eliminating one or more MCSs from the set that correspond to a number of spatial streams higher than the determined number of spatial streams of the received frame and eliminating one or more MCSs from the set that correspond to a modulation order higher than the determined modulation order of the received frame; and
select a primary MCS from the updated set of supported MCSs that corresponds to the highest number of spatial streams and highest modulation order of remaining MCSs in the updated set of supported MCSs;
and wherein the transmitter is further configured to transmit the response using the primary MCS.

6. The apparatus of claim 5, wherein the set of supported MCSs comprises one or more MCSs that are supported by non-HT, HT, or VHT stations.

7. The apparatus of claim 1, wherein the circuitry configured to select the MCS is further configured to select the MCS corresponding to a data rate that is equal to or lower than the data rate of the received frame.

8. A method for wireless communications, comprising:
receiving a frame that elicits a response;
selecting a modulation class and a modulation and coding scheme (MCS) for transmission of the response by applying different rules for selecting the modulation class and MCS depending on whether the frame was transmitted with a high throughput (HT), very high throughput (VHT), or non-HT modulation class; and
transmitting the response using the selected modulation class and the selected MCS.

9. The method of claim 8, wherein the rules allow the response to be transmitted using a VHT modulation class only if the frame was transmitted using a VHT modulation class.

10. The method of claim 8, wherein the rules allow the response to be transmitted using a HT or non-HT modulation class if the frame was transmitted using a VHT modulation class.

11. The method of claim 8, further comprising:
determining number of spatial streams and modulation order of the received frame if the frame was transmitted as a VHT transmission, wherein the selected MCS corresponds to a number of spatial streams that is equal or smaller than the determined number of spatial streams of the received frame, and the selected modulation order is equal to or smaller than the determined modulation order of the received frame.

12. The method of claim 11, further comprising:
identifying a set of supported MCSs; and
updating the set of supported MCSs by eliminating one or more MCSs from the set that correspond to a number of spatial streams higher than the determined number of spatial streams of the received frame and eliminating one or more MCSs from the set that correspond to a modulation order higher than the determined modulation order of the received frame;
selecting a primary MCS from the updated set of supported MCSs that corresponds to the highest number of spatial streams and highest modulation order of remaining MCSs in the updated set of supported MCSs; and
transmitting the response using the primary MCS.

13. The method of claim 12, wherein the set of supported MCSs comprises one or more MCSs that are supported by non-HT, HT, or VHT stations.

14. The method of claim 8, wherein selecting the MCS comprises:
selecting the MCS corresponding to a data rate that is equal to or lower than the data rate of the received frame.

15. An apparatus for wireless communications, comprising:
means for receiving a frame that elicits a response;
means for selecting a modulation class and a modulation and coding scheme (MCS) for transmission of the response, wherein the means for selecting comprises means for applying different rules for selecting the modulation class and MCS depending on whether the frame was transmitted with a high throughput (HT), very high throughput (VHT), or non-HT modulation class; and
means for transmitting the response using the selected modulation class and the selected MCS.

16. The apparatus of claim 15, wherein the rules allow the response to be transmitted using a VHT modulation class only if the frame was transmitted using a VHT modulation class.

17. The apparatus of claim 15, wherein the rules allow the response to be transmitted using a HT or non-HT modulation class if the frame was transmitted using a VHT modulation class.

18. The apparatus of claim 15, further comprising:
means for determining number of spatial streams and modulation order of the received frame if the frame was transmitted as a VHT transmission, wherein the selected MCS corresponds to a number of spatial streams that is equal or smaller than the determined number of spatial streams of the received frame, and the selected modulation order is equal to or smaller than the determined modulation order of the received frame.

19. The apparatus of claim 18, further comprising:
means for identifying a set of supported MCSs; and
means for updating the set of supported MCSs by eliminating one or more MCSs from the set that correspond to a number of spatial streams higher than the determined number of spatial streams of the received frame and eliminating one or more MCSs from the set that correspond to a modulation order higher than the determined modulation order of the received frame; and
means for selecting a primary MCS from the updated set of supported MCSs that corresponds to the highest number of spatial streams and highest modulation order of remaining MCSs in the updated set of supported MCSs, wherein the means for transmitting further transmits the response using the primary MCS.

20. The apparatus of claim 19, wherein the set of supported MCSs comprises one or more MCSs that are supported by non-HT, HT, or VHT stations.

21. The apparatus of claim 15, wherein the means for selecting the MCS comprises:
means for selecting the MCS corresponding to a data rate that is equal to or lower than the data rate of the received frame.

22. A computer-program product for wireless communications, comprising a non-transitory computer-readable medium comprising instructions executable for:
receiving a frame that elicits a response;
selecting a modulation class and a modulation and coding scheme (MCS) for transmission of the response by applying different rules for selecting the modulation class and MCS depending on whether the frame was transmitted with a high throughput (HT), very high throughput (VHT), or non-HT modulation class; and
transmitting the response using the selected modulation class and the selected MCS.

23. A station for wireless communications, comprising:
at least one antenna;
a receiver configured to receive, via the at least one antenna, a frame that elicits a response;
a circuitry configured to select a modulation class and a modulation and coding scheme (MCS) for transmission of the response, wherein the circuitry is configured to apply different rules for selecting the modulation class and MCS depending on whether the frame was transmitted with a high throughput (HT), very high throughput (VHT), or non-HT modulation class; and
a transmitter configured to transmit the response using the selected modulation class and the selected MCS.

* * * * *